United States Patent
Sawada (10) Patent No.: US 10,972,593 B1
(45) Date of Patent: Apr. 6, 2021

(54) RADIO FREQUENCY MODULE AND COMMUNICATION DEVICE

(71) Applicant: Murata Manufacturing Co., Ltd., Nagaokakyo (JP)

(72) Inventor: Yoichi Sawada, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 17/020,878

(22) Filed: Sep. 15, 2020

(30) Foreign Application Priority Data

Sep. 20, 2019 (JP) .............................. JP2019-171572

(51) Int. Cl.
*H04M 1/02* (2006.01)
*H04B 1/48* (2006.01)
*H04B 1/00* (2006.01)

(52) U.S. Cl.
CPC ........ *H04M 1/0277* (2013.01); *H04B 1/0057* (2013.01); *H04B 1/48* (2013.01)

(58) Field of Classification Search
CPC .................................................. H04M 1/0277
See application file for complete search history.

(56) References Cited

U.S. PATENT DOCUMENTS

| 10,292,269 | B1* | 5/2019 | Mudakatte | H01L 23/5227 |
| 2002/0032038 | A1* | 3/2002 | Furutani | H04B 1/005 455/552.1 |
| 2002/0072147 | A1* | 6/2002 | Sayanagi | H01L 24/73 438/106 |
| 2011/0045865 | A1* | 2/2011 | Viering | H04W 52/325 455/522 |

FOREIGN PATENT DOCUMENTS

JP 2017-098630 A 6/2017

* cited by examiner

*Primary Examiner* — Hsinchun Liao
(74) *Attorney, Agent, or Firm* — Xsensus LLP (57) ABSTRACT

A radio frequency module includes: a module board including a first principal surface and a second principal surface on opposite sides of the module board; an antenna connection terminal; a diplexer connected to the antenna connection terminal and including at least a first inductor which is a chip inductor; a transmission power amplifier configured to amplify a transmission signal; a reception low noise amplifier configured to amplify a reception signal; and a second inductor which is a chip inductor disposed on one of a transmission path connecting the diplexer and the transmission power amplifier and a reception path connecting the diplexer and the reception low noise amplifier. The first inductor is mounted on the first principal surface, and the second inductor is mounted on the second principal surface.

20 Claims, 5 Drawing Sheets

RADIO FREQUENCY MODULE AND COMMUNICATION DEVICE

CROSS REFERENCE TO RELATED APPLICATION

The present application is based on and claims priority of Japanese Patent Application No. 2019-171572 filed on Sep. 20, 2019. The entire disclosure of the above-identified application, including the specification, drawings and claims is incorporated herein by reference in its entirety.

FIELD

The present disclosure relates to a radio frequency module and a communication device.

BACKGROUND

In mobile communication apparatuses such as mobile phones, the arrangement of circuit elements included in radio frequency front-end circuits is becoming complex, particularly with developments in multiband technologies.

Japanese Unexamined Patent Application Publication No. 2017-98630 discloses a front-end module including: a plurality of transmission and reception paths for transmitting and receiving radio frequency signals of predetermined communication bands (frequency bands); an input switch to which the plurality of transmission and reception paths are connected; and an antenna matching circuit connected between the input switch and an antenna connection terminal. The antenna matching circuit includes at least one of an inductor or a capacitor, and is an LC filter having a filtering function. The front-end module reduces deterioration of isolation between the input and the output by optimizing the arrangement, in the peripheral portion of a switch IC, of filters including the above LC filter and matching circuits including the above antenna matching circuit, which are disposed on the transmission and reception paths.

SUMMARY

Technical Problems

When the front-end module disclosed in Japanese Unexamined Patent Application Publication No. 2017-98630 is realized as a miniaturized radio frequency module, however, electromagnetic coupling may occur between an inductor disposed on a transmission path or a reception path and an inductor of an LC filter (an antenna matching circuit). In that case, a harmonic of a high-output transmission signal transferred via a transmission path or spurious waves of intermodulation distortion between the transmission signal and another radio frequency signal may flow into a reception path due the electromagnetic coupling, and cause deterioration of the reception sensitivity of that reception path. Alternatively, in that case, superposition of a harmonic of a high-output transmission signal transferred via a transmission path on the high-output transmission signal may cause deterioration of the signal quality of a transmission signal output from the front-end module.

The present disclosure is to address the above problems, and provides a radio frequency module and a communication device that reduce deterioration of the reception sensitivity or the quality of a transmission signal.

Solutions

A radio frequency module according to an aspect of the present disclosure is a radio frequency module including: a module board including a first principal surface and a second principal surface on opposite sides of the module board; an antenna connection terminal; an LC filter connected to the antenna connection terminal and including at least a first chip inductor; a transmission power amplifier; a reception low noise amplifier; and a second chip inductor disposed on one of a transmission path connecting the LC filter and the transmission power amplifier and a reception path connecting the LC filter and the reception low noise amplifier, wherein the first chip inductor is mounted on the first principal surface, and the second chip inductor is mounted on the second principal surface.

Advantageous Effects

According to the present disclosure, it is possible to provide a radio frequency module and a communication device that reduce deterioration of the reception sensitivity or the quality of a transmission signal.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, embodiments of the present disclosure will be described in detail. Note that the embodiments described below each illustrate a general or specific example. The numerical values, shapes, materials, constituent elements, the arrangement and connection of the constituent elements, etc., illustrated in the embodiment below are mere examples, and are therefore not intended to limit the present disclosure. Among the constituent elements in the following working examples and variations, constituent elements not recited in the independent claims will be described as optional constituent elements. In addition, the sizes of constituent elements and the ratios of the sizes illustrated in the drawings are not necessarily precise. In the drawings, essentially the same constituent elements share the same reference signs, and redundant descriptions will be omitted or simplified.

In the following description, terms indicating relationships between elements, e.g., "parallel" and "vertical", terms indicating the shapes of elements, e.g., "quadrilateral", and value ranges do not have the meanings in the strict sense only, but include essentially equivalent value ranges and meanings, for example deviations of about a few percent.

Additionally, in the following description, when A, B, and C are mounted on a board, and "C is disposed between A and B in a plan view of the board (or in a plan view of a principal surface of the board)", it means that a straight line connecting a given point in A and a given point in B passes through the region of C in a plan view of the board. Furthermore, a plan view of the board means that the board and circuit elements mounted on the board re orthographically projected on a plane parallel to the board.

In the following description, a "transmission path" refers to a transfer path including, for example, a line for propagating radio frequency transmission signals, an electrode directly connected to the line, and a terminal directly connected to the line or the electrode. A "reception path" refers to a transfer path including, for example, a line for propagating radio frequency reception signals, an electrode directly connected to the line, and a terminal directly connected to the line or the electrode. A "signal path" refers to a transfer path including, for example, a line for propagating radio frequency signals, an electrode directly connected to the line, and a terminal directly connected to the line or the electrode.

Embodiment

[1. Circuit Configuration of Radio Frequency Module 1 and Communication Device 5]

Figure 1:
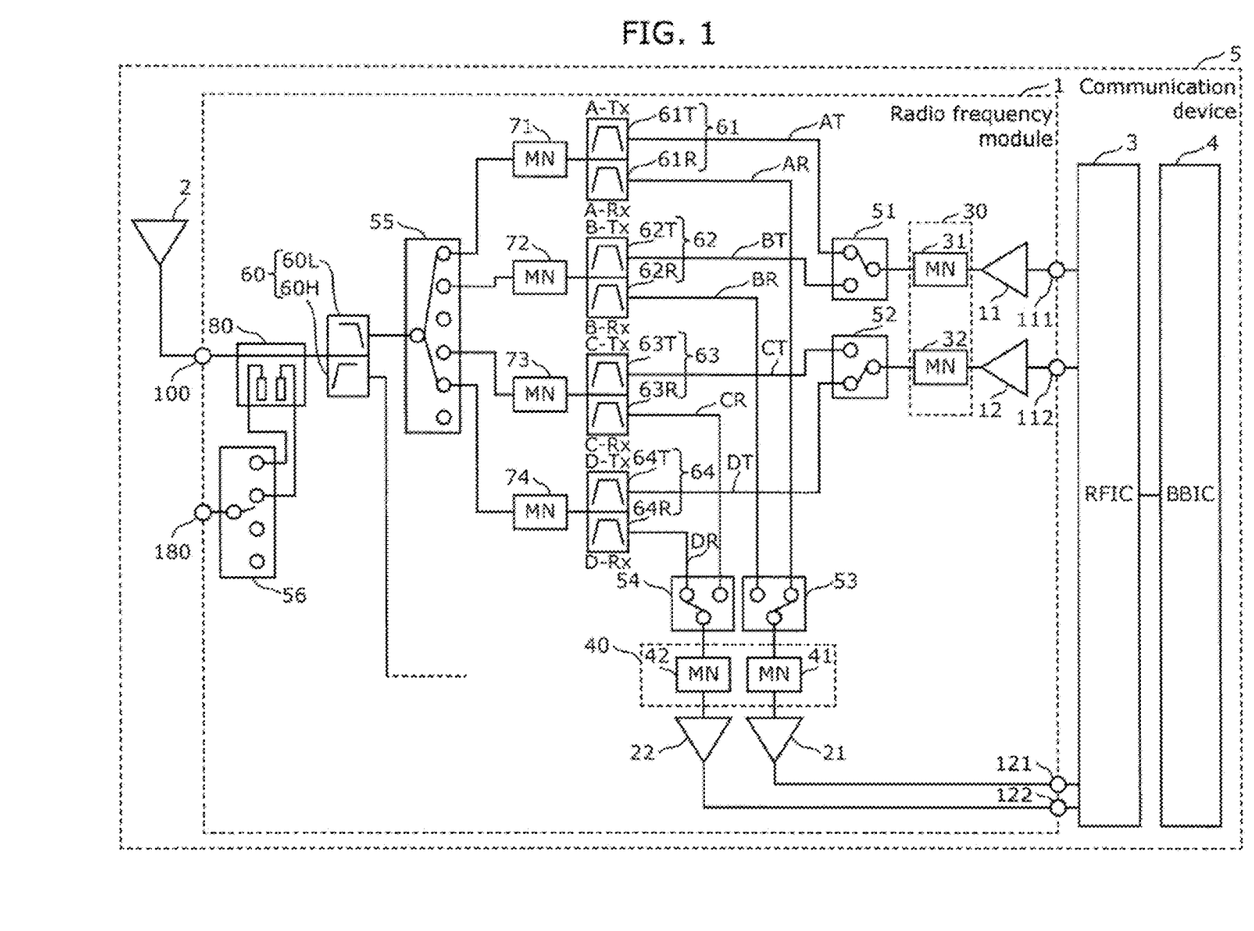
FIG. 1 illustrates a circuit configuration of a radio frequency module according to an embodiment.

FIG. 1 illustrates a circuit configuration of radio frequency module 1 according to an embodiment. As illustrated in this figure, communication device 5 includes radio frequency module 1, antenna 2, radio frequency (RF) signal processing circuit (RF integrated circuit (IC)) 3, and baseband signal processing circuit (BBIC) 4.

RFIC 3 is an RF signal processing circuit that processes a radio frequency signal which is to be transmitted by antenna 2 and a radio frequency signal which has been received by antenna 2. Specifically, RFIC 3 processes reception signals input via reception paths of radio frequency module 1 by down-conversion, for example, and outputs resultant reception signals to BBIC 4. RFIC 3 also processes transmission signals input from BBIC 4 by up-conversion, for example, and outputs resultant transmission signals to transmission paths of radio frequency module 1.

BBIC 4 is a circuit that performs signal processing using the intermediate frequency band lower than the frequency band of a radio frequency signal transferred by radio frequency module 1. The signal processed by BBIC 4 is used as, for example, an image signal for image display, or an audio signal for reproduction by a loudspeaker.

RFIC 3 also functions as a controller that controls connections of switches 51, 52, 53, 54, 55, and 56 included in radio frequency module 1 based on a communication band (frequency band) used. Specifically, RFIC 3 switches the connections of switches 51 to 56 included in radio frequency module 1 according to control signals (not illustrated). Note that the controller may be provided outside RFIC 3; for example in BBIC 4.

Antenna 2 is connected to antenna connection terminal 100 of radio frequency module 1, radiates a radio frequency signal output from radio frequency module 1, receives a radio frequency signal from outside, and outputs the received radio frequency signal to radio frequency module 1.

Note that in communication device 5 according to the present embodiment, antenna 2 and BBIC 4 are not essential.

Next, a detailed configuration of radio frequency module 1 will be described.

As illustrated in FIG. 1, radio frequency module 1 includes antenna connection terminal 100, transmission power amplifiers 11 and 12, reception low noise amplifiers 21 and 22, transmission filters 61T, 62T, 63T, and 64T, reception filters 61R, 62R, 63R, and 64R, transmission output matching circuit 30, reception input matching circuit 40, matching circuits 71, 72, 73, and 74, switches 51, 52, 53, 54, 55, and 56, transmission paths AT, BT, CT, and DT, reception paths AR, BR, CR, and DR, diplexer 60, coupler 80, and coupler output terminal 180.

Antenna connection terminal 100 is an antenna common terminal connected to antenna 2.

Transmission power amplifier 11 is an amplifier that amplifies radio frequency signals of communication band A (a first communication band) and communication band B (a second communication band) which belong to a first frequency band group. The radio frequency signals of communication bands A and B are input through transmission input terminal 111. Transmission power amplifier 12 is an amplifier that amplifies radio frequency signals of communication band C and communication band D which belong to a second frequency band group different from the first frequency band group. The radio frequency signals of communication bands C and D are input through transmission input terminal 112.

Reception low noise amplifier 21 is an amplifier that amplifies radio frequency signals of communication bands A and B with low noise, and outputs the amplified signals to reception output terminal 121. Reception low noise amplifier 22 is an amplifier that amplifies radio frequency signals of communication bands C and D with low noise, and outputs the amplified signals to reception output terminal 122.

Transmission path AT is for transferring transmission signals of communication band A. One end of transmission path AT is connected to antenna connection terminal 100, and the other end of transmission path AT is connected to transmission power amplifier 11. Transmission path BT is for transferring transmission signals of communication band B. One end of transmission path BT is connected to antenna connection terminal 100, and the other end of transmission path BT is connected to transmission power amplifier 11. Transmission path CT is for transferring transmission signals of communication band C. One end of transmission path CT is connected to antenna connection terminal 100, and the other end of transmission path CT is connected to transmission power amplifier 12. Transmission path DT is for transferring transmission signals of communication band D. One end of transmission path DT is connected to antenna connection terminal 100, and the other end of transmission path DT is connected to transmission power amplifier 12.

Reception path AR is for transferring reception signals of communication band A. One end of reception path AR is connected to antenna connection terminal 100, and the other end of reception path AR is connected to reception low noise amplifier 21. Reception path BR is for transferring reception signals of communication band B. One end of reception path BR is connected to antenna connection terminal 100, and the other end of reception path BR is connected to reception low noise amplifier 21. Reception path CR is for transferring reception signals of communication band C. One end of reception path CR is connected to antenna connection terminal 100, and the other end of reception path CR is connected to reception low noise amplifier 22. Reception path DR is for transferring reception signals of communication band D. One end of reception path DR is connected to antenna connection terminal 100, and the other end of reception path DR is connected to reception low noise amplifier 22.

Transmission filter 61T is disposed on transmission path AT. Among the transmission signals amplified by transmission power amplifier 11, transmission signals in the transmission range of communication band A pass through transmission filter 61T. Transmission filter 62T is disposed on transmission path BT. Among the transmission signals amplified by transmission power amplifier 11, transmission signals in the transmission range of communication band B pass through transmission filter 62T. Transmission filter 63T is disposed on transmission path CT. Among the transmission signals amplified by transmission power amplifier 12, transmission signals in the transmission range of communication band C pass through transmission filter 63T. Transmission filter 64T is disposed on transmission path DT. Among the transmission signals amplified by transmission power amplifier 12, transmission signals in the transmission range of communication band D pass through transmission filter 64T.

Reception filter 61R is disposed on reception path AR. Among reception signals input from antenna connection terminal 100, reception signals in the reception range of communication band A pass through reception filter 61R. Reception filter 62R is disposed on reception path BR. Among the reception signals input from antenna connection terminal 100, reception signals in the reception range of communication band B pass through reception filter 62R. Reception filter 63R is disposed on reception path CR. Among the reception signals input from antenna connection terminal 100, reception signals in the reception range of communication band C pass through reception filter 63R. Reception filter 64R is disposed on reception path DR. Among the reception signals input from antenna connection terminal 100, reception signals in the reception range of communication band D pass through reception filter 64R.

Transmission filter 61T and reception filter 61R constitute duplexer 61 having communication band A as the passband. Transmission filter 62T and reception filter 62R constitute duplexer 62 having communication band B as the passband. Transmission filter 63T and reception filter 63R constitute duplexer 63 having communication band C as the passband. Transmission filter 64T and reception filter 64R constitute duplexer 64 having communication band D as the passband.

Transmission output matching circuit 30 includes matching circuits 31 and 32. Matching circuit 31 is disposed on transmission paths AT and BT connecting transmission power amplifier 11 and transmission filters 61T and 62T, respectively, and matches the impedance of transmission power amplifier 11 with the impedances of transmission filters 61T and 62T. Matching circuit 32 is disposed on transmission paths CT and DT connecting transmission power amplifier 12 and transmission filters 63T and 64T, respectively, and matches the impedance of transmission power amplifier 12 with the impedances of transmission filters 63T and 64T. Matching circuits 31 and 32 each include a second chip inductor.

Reception input matching circuit 40 includes matching circuits 41 and 42. Matching circuit 41 is disposed on reception paths AR and BR connecting reception low noise amplifier 21 and reception filters 61R and 62R, respectively, and matches the impedance of reception low noise amplifier 21 with the impedances of reception filters 61R and 62R. Matching circuit 42 is disposed on reception paths CR and DR connecting reception low noise amplifier 22 and reception filters 63R and 64R, respectively, and matches the impedance of reception low noise amplifier 22 with the impedances of reception filters 63R and 64R. Matching circuits 41 and 42 each include a second chip inductor.

Switch 51 includes a common terminal and two selection terminals. The common terminal of switch 51 is connected to the output terminal of transmission power amplifier 11 via matching circuit 31. One of the selection terminals of switch 51 is connected to transmission filter 61T disposed on transmission path AT, and the other selection terminal of switch 51 is connected to transmission filter 62T disposed on transmission path BT. In this connection configuration, switch 51 switches between connection of the common terminal to one selection terminal and connection of the common terminal to the other selection terminal. In other words, switch 51 switches connection and disconnection of transmission power amplifier 11 with transmission path AT, and also switches connection and disconnection of transmission power amplifier 11 with transmission path BT. Switch 51 is a single pole double throw (SPDT) switch circuit, for example.

Switch 52 includes a common terminal and two selection terminals. The common terminal of switch 52 is connected to the output terminal of transmission power amplifier 12 via matching circuit 32. One of the selection terminals of switch 52 is connected to transmission filter 63T disposed on transmission path CT, and the other selection terminal of switch 52 is connected to transmission filter 64T disposed on transmission path DT. In this connection configuration, switch 52 switches between connection of the common terminal to one selection terminal and connection of the common terminal to the other selection terminal. In other words, switch 52 switches connection and disconnection of transmission power amplifier 12 with transmission path CT, and also switches connection and disconnection of transmission power amplifier 12 with transmission path DT. Switch 52 is an SPDT switch circuit, for example.

Switch 53 includes a common terminal and two selection terminals. The common terminal of switch 53 is connected to the input terminal of reception low noise amplifier 21 via matching circuit 41. One of the selection terminals of switch 53 is connected to reception filter 61R disposed on reception path AR, and the other selection terminal of switch 53 is connected to reception filter 62R disposed on reception path BR. In this connection configuration, switch 53 switches between connection of the common terminal to one selection terminal and connection of the common terminal to the other selection terminal. In other words, switch 53 switches connection and disconnection of reception low noise amplifier 21 with reception path AR, and also switches connection and disconnection of reception low noise amplifier 21 with reception path BR. Switch 53 is an SPDT switch circuit, for example.

Switch 54 includes a common terminal and two selection terminals. The common terminal of switch 54 is connected to the input terminal of reception low noise amplifier 22 via matching circuit 42. One of the selection terminals of switch 54 is connected to reception filter 63R disposed on reception path CR, and the other selection terminal of switch 54 is connected to reception filter 64R disposed on reception path DR. In this connection configuration, switch 54 switches between connection of the common terminal to one selection terminal and connection of the common terminal to the other selection terminal. In other words, switch 54 switches connection and disconnection of reception low noise amplifier 22 with reception path CR, and also switches connection and disconnection of reception low noise amplifier 22 with reception path DR. Switch 54 is an SPDT switch circuit, for example.

Switch 55 is an example of an antenna switch. Switch 55 is connected to antenna connection terminal 100 via diplexer 60, and switches (1) connection of antenna connection terminal 100 to transmission path AT and reception path AR, (2) connection of antenna connection terminal 100 to transmission path BT and reception path BR, (3) connection of antenna connection terminal 100 to transmission path CT and reception path CR, and (4) connection of antenna connection terminal 100 to transmission path DT and reception path DR. Note that switch 55 includes a multiple-connection switch circuit capable of simultaneously establishing two or more of the connections (1) to (4) described above.

Matching circuit 71 is disposed on a path connecting switch 55 and duplexer 61, and matches the impedance of antenna 2 and switch 55 with the impedance of duplexer 61. Matching circuit 72 is disposed on a path connecting switch 55 and duplexer 62, and matches the impedance of antenna 2 and switch 55 with the impedance of duplexer 62. Matching circuit 73 is disposed on a path connecting switch 55 and duplexer 63, and matches the impedance of antenna 2 and switch 55 with the impedance of duplexer 63. Matching circuit 74 is disposed on a path connecting switch 55 and duplexer 64, and matches the impedance of antenna 2 and switch 55 with the impedance of duplexer 64. Matching circuits 71 to 74 each include a second chip inductor.

Diplexer 60 is an example of a multiplexer, and includes filters 60L and 60H. Filter 60L is an example of an LC filter that includes a first chip inductor. Filter 60L is a filter having, as the passband, a frequency range including the first frequency band group and the second frequency band group. Filter 60H is an example of an LC filter that includes a first chip inductor. Filter 60H is a filter having, as the passband, a frequency range including another frequency band group different from the first frequency band group and the second frequency band group. One terminal of filter 60L and one terminal of filter 60H are connected commonly to antenna connection terminal 100. Note that when the first frequency band group and the second frequency band group are lower than the above other frequency band group, filter 60L may be a low-pass filter and filter 60H may be a high-pass filter. Diplexer 60 may include only filter 60L having a chip inductor, and in such a case, may be a matching circuit having an impedance matching function.

Coupler 80 and switch 56 form a circuit that monitors the power intensity of radio frequency signals transferred between antenna connection terminal 100 and switch 55, and output the monitored power intensity to, for example, RFIC 3 via coupler output terminal 180.

Note that transmission filters 61T to 64T and reception filters 61R to 64R described above may each be, but are not limited to, any of, for example, an acoustic wave filter that uses surface acoustic waves (SAWs), an acoustic wave filter that uses bulk acoustic waves (BAWs), an LC resonance filter, and a dielectric filter.

Transmission power amplifiers 11 and 12 and reception low noise amplifiers 21 and 22 are each configured using, for example, a field effect transistor (FET) or a hetero-junction bipolar transistor (HBT) including, for instance, an Si-based complementary metal oxide semiconductor (CMOS) or GaAs as a material.

Reception low noise amplifiers 21 and 22 and switches 53, 54, and 55 may be formed in a semiconductor integrated circuit (IC). Additionally, the semiconductor IC may include transmission power amplifiers 11 and 12 and switches 51 and 52. The semiconductor IC includes a CMOS for example, and is specifically formed by the silicon on insulator (SOI) process. Accordingly, the semiconductor IC can be manufactured at low cost. Note that the semiconductor IC may include at least one of GaAs, SiGe, or GaN. Accordingly, a radio frequency signal having high quality of amplification and noise properties can be output.

Note that matching circuits 71 to 74, coupler 80, switch 56, and coupler output terminal 180 are not essential to the radio frequency module according to the present disclosure.

In the configuration of radio frequency module 1 described above, transmission power amplifier 11, matching circuit 31, switch 51, transmission filter 61T, matching circuit 71, switch 55, filter 60L, and transmission path AT are included in a first transmitter circuit that transfers transmission signals of communication band A to antenna connection terminal 100. Filter 60L, switch 55, matching circuit 71, reception filter 61R, switch 53, matching circuit 41, reception low noise amplifier 21, and reception path AR are included in a first receiver circuit that transfers reception signals of communication band A from antenna 2 via antenna connection terminal 100.

Transmission power amplifier 11, matching circuit 31, switch 51, transmission filter 62T, matching circuit 72, switch 55, filter 60L, and transmission path BT are included in a second transmitter circuit that transfers transmission signals of communication band B to antenna connection terminal 100. Filter 60L, switch 55, matching circuit 72, reception filter 62R, switch 53, matching circuit 41, reception low noise amplifier 21, and reception path BR are included in a second receiver circuit that transfers reception signals of communication band B from antenna 2 via antenna connection terminal 100.

Transmission power amplifier 12, matching circuit 32, switch 52, transmission filter 63T, matching circuit 73, switch 55, filter 60L, and transmission path CT are included in a third transmitter circuit that transfers transmission signals of communication band C to antenna connection terminal 100. Filter 60L, switch 55, matching circuit 73, reception filter 63R, switch 54, matching circuit 42, reception low noise amplifier 22, and reception path CR are included in a third receiver circuit that transfers reception signals of communication band C from antenna 2 via antenna connection terminal 100.

Transmission power amplifier 12, matching circuit 32, switch 52, transmission filter 64T, matching circuit 74, switch 55, filter 60L, and transmission path DT are included in a fourth transmitter circuit that transfers transmission signals of communication band D to antenna connection terminal 100. Filter 60L, switch 55, matching circuit 74, reception filter 64R, switch 54, matching circuit 42, reception low noise amplifier 22, and reception path DR are included in a fourth receiver circuit that transfers reception signals of communication band D from antenna 2 via antenna connection terminal 100.

According to the above circuit configuration, radio frequency module 1 can simultaneously transmit, receive, and/or transfer a radio frequency signal of communication band A or B and a radio frequency signal of communication band C or D.

Note that in the radio frequency module according to the present disclosure, the above four transmitter circuits and four receiver circuits need not be connected to antenna connection terminal 100 via switch 55, and may be connected to antenna 2 via different terminals. It is sufficient if the radio frequency module according to the present disclosure includes: filter 60L; one or more chip inductors each disposed in a different one of the first to fourth transmitter circuits and the first to fourth receiver circuits; at least one of the first to fourth transmitter circuits; and at least one of the first to fourth receiver circuits. It is sufficient if the first transmitter circuit includes transmission power amplifier 11 and transmission path AT in addition to filter 60L and the above-described chip inductor. It is sufficient if the second transmitter circuit includes transmission power amplifier 11 and transmission path BT in addition to filter 60L and the above-described chip inductor. It is sufficient if the third transmitter circuit includes transmission power amplifier 12 and transmission path CT in addition to filter 60L and the above-described chip inductor. It is sufficient if the fourth transmitter circuit includes transmission power amplifier 12 and transmission path DT in addition to filter 60L and the above-described chip inductor. Furthermore, it is sufficient if the first receiver circuit includes reception low noise amplifier 21 and reception path AR in addition to filter 60L and the above-described chip inductor. It is sufficient if the second receiver circuit includes reception low noise amplifier 21 and reception path BR in addition to filter 60L and the above-described chip inductor. It is sufficient if the third receiver circuit includes reception low noise amplifier 22 and reception path CR in addition to filter 60L and the above-described chip inductor. It is sufficient if the fourth receiver circuit includes reception low noise amplifier 22 and reception path DR in addition to filter 60L and the above-described chip inductor.

Here, in the case of mounting each circuit element included in radio frequency module 1 on a single module board as a small front-end circuit, it is necessary to reduce the layout area for circuit components on the module board surface. In such a case, electromagnetic coupling is expected between a chip inductor disposed on any of transmission paths AT to DT and reception paths AR to DR and a chip inductor included in diplexer 60 connected to antenna connection terminal 100. In that case, a harmonic of a high-output transmission signal transferred via a transmission path flows or spurious waves of intermodulation distortion between the transmission signal and another radio frequency signal flow into a reception path among reception paths AR to DR due the electromagnetic coupling, thereby causing deterioration of the reception sensitivity of that reception path. Alternatively, in that case, the signal quality of a transmission signal output from the radio frequency module deteriorates when a harmonic of a high-output transmission signal transferred via a transmission path superposes on the high-output transmission signal.

To address this, radio frequency module 1 according to the present embodiment has a configuration that reduces electromagnetic coupling between a chip inductor disposed on any of transmission paths AT to DT and reception paths AR to DR and a chip inductor included in diplexer 60 connected to antenna connection terminal 100. The following describes a configuration of radio frequency module 1 according to the present embodiment that reduces the above electromagnetic coupling.

[2. Arrangement of Circuit Elements of Radio Frequency Module 1A According to Working Example 1]

Figure 2A:
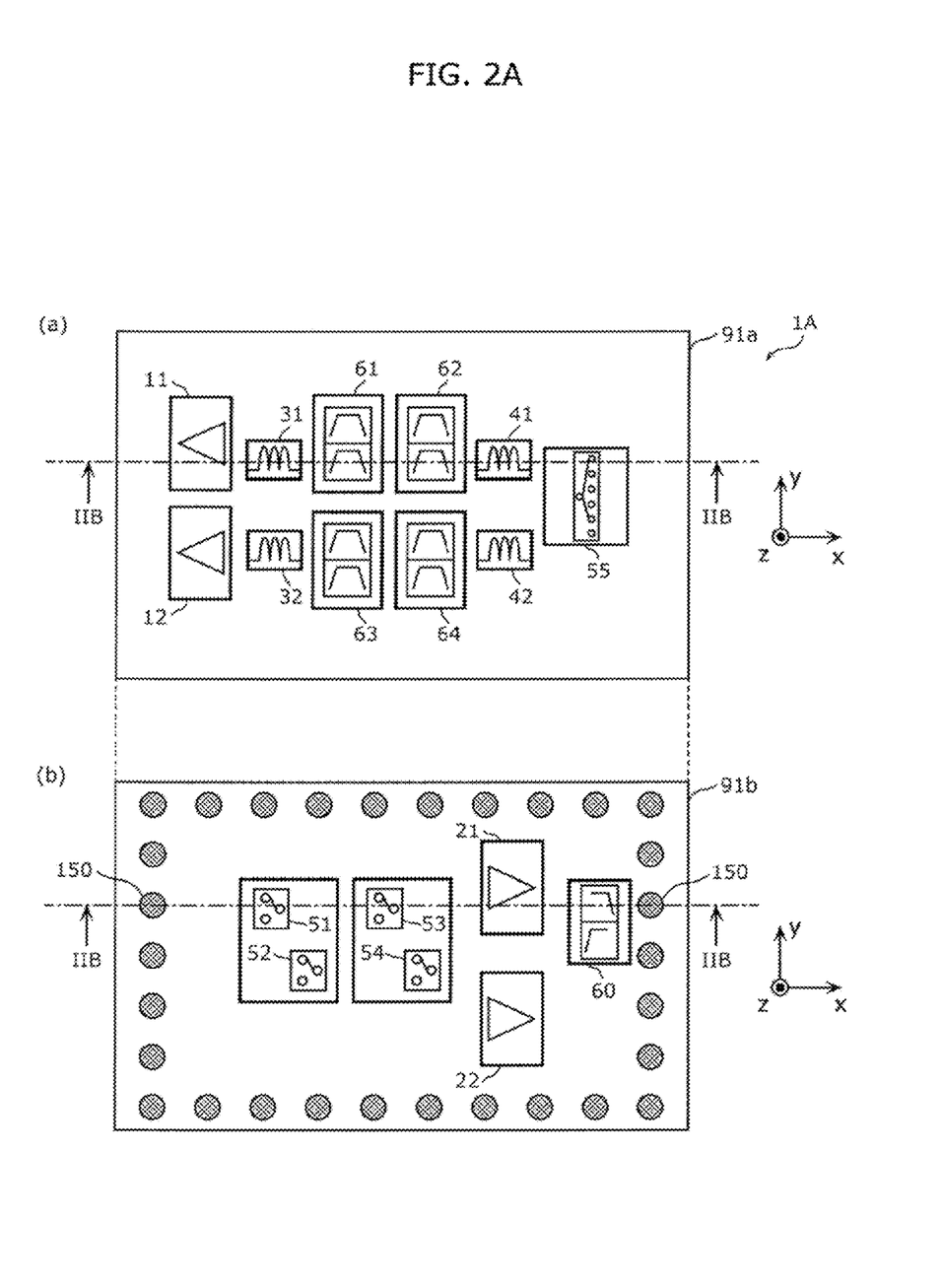
FIG. 2A is a schematic diagram illustrating a plan view configuration of a radio frequency module according to Working Example 1.
Figure 2B:
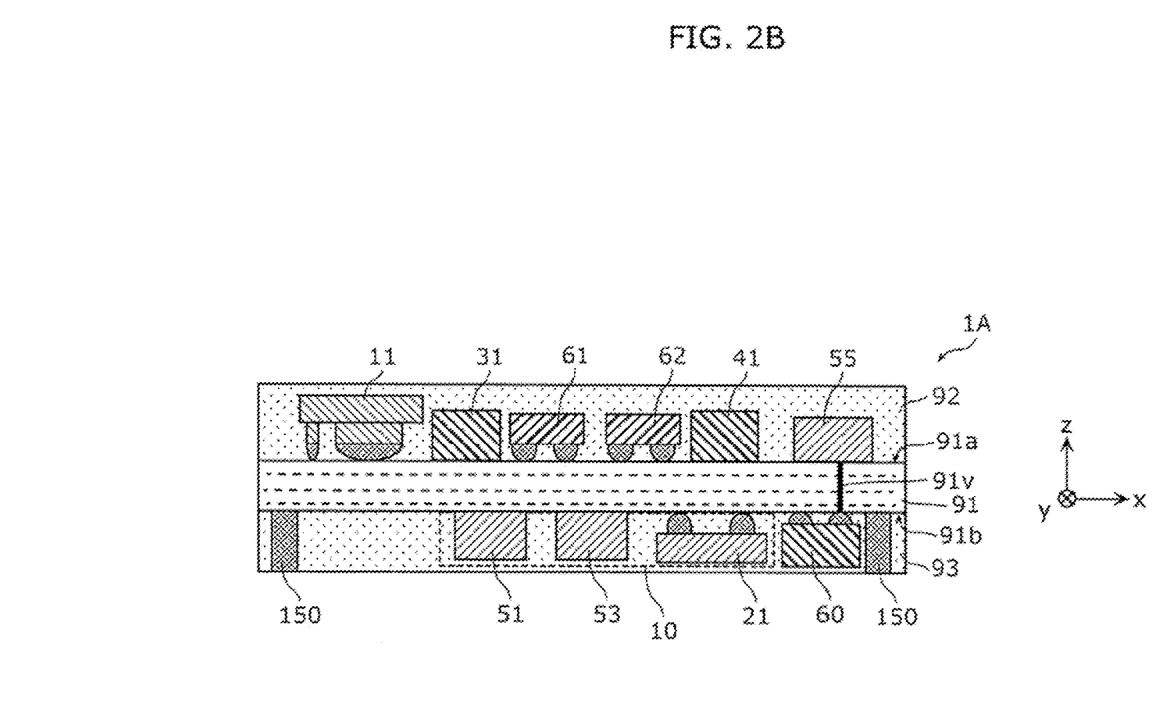
FIG. 2B is a schematic diagram illustrating a cross-sectional configuration of the radio frequency module according to Working Example 1.

FIG. 2A is a schematic diagram illustrating a plan view configuration of radio frequency module 1A according to Working Example 1. FIG. 2B is a schematic diagram illustrating a cross-sectional configuration of radio frequency module 1A according to Working Example 1, and is specifically a cross-sectional view taken at line IIB-IIB in FIG. 2A. Note that part (a) of FIG. 2A illustrates how circuit elements are arranged when, of principal surfaces 91a and 91b located on opposite sides of module board 91, principal surface 91a is viewed from the z-axis positive side. Part (b) of FIG. 2A is a perspective view illustrating how circuit elements are arranged when principal surface 91b is viewed from the z-axis positive side.

Radio frequency module 1A according to Working Example 1 is to specifically show an arrangement of circuit elements included in radio frequency module 1 according to the embodiment.

As illustrated in FIG. 2A and FIG. 2B, radio frequency module 1A according to this working example includes module board 91 and resin components 92 and 93 in addition to the circuit configuration illustrated in FIG. 1.

Module board 91 is a board which includes principal surface 91a (a second principal surface) and principal surface 91b (a first principal surface) on opposite sides of module board 91, and on which the above-described transmitter circuits and receiver circuits are mounted. Examples of a board used for module board 91 include a low temperature co-fired ceramics (LTCC) board having a configuration in which a plurality of dielectric layers are stacked, a high temperature co-fired ceramics (HTCC) board, a component-embedded board, a board having a redistribution layer (RDL), and a printed circuit board.

Resin component 92 is disposed on principal surface 91a of module board 91, and covers a part of the transmitter circuits, a part of the receiver circuits, and principal surface 91a of module board 91. Resin component 92 has a function to ensure the reliability of circuit elements included in the transmitter circuits and receiver circuits, such as the mechanical strength and moisture resistance. Resin component 93 is disposed on principal surface 91b of module board 91, and covers a part of the transmitter circuits, a part of the receiver circuits, and principal surface 91b of module board 91. Resin component 93 has a function to ensure the reliability of circuit elements included in the transmitter circuits and receiver circuits, such as the mechanical strength and moisture resistance. Note that resin components 92 and 93 are not essential to the radio frequency module according to the present disclosure.

Matching circuits 31, 32, 41, 42, 71 to 74 each include at least a chip inductor.

As illustrated in FIG. 2A and FIG. 2B, in radio frequency module 1A according to this working example, transmission power amplifiers 11 and 12, duplexers 61 to 64, matching circuits 31, 32, 41, and 42, and switch 55 are surface-mounted on principal surface 91a of module board 91. Reception low noise amplifiers 21 and 22, switches 51, 52, 53, and 54, and diplexer 60 are surface-mounted on principal surface 91b of module board 91. Although matching circuits 71 to 74 and coupler 80 are not illustrated in FIG. 2A and FIG. 2B, they may be surface-mounted on any of principal surfaces 91a and 91b of module board 91, or may be embedded in module board 91.

In this working example, matching circuits 31, 32, 41, and 42 each include a second chip inductor, and are mounted on principal surface 91a. On the other hand, diplexer 60 (filters 60L and 60H) includes a first chip inductor, and diplexer 60 is mounted on principal surface 91b.

According to the above configuration, the second chip inductors are disposed on transmission paths AT to DT connecting diplexer 60 and transmission power amplifiers 11 and 12 or on reception paths AR to DR connecting diplexer 60 and reception low noise amplifiers 21 and 22 are disposed on principal surface 91a. The first chip inductor is included in diplexer 60 connected to antenna connection terminal 100 is disposed on principal surface 91b. In other words, the first chip inductor and the second chip inductors are disposed with the module board interposed therebetween. Accordingly, module board 91 can shield the electromagnetic fields generated by the first chip inductor and the second chip inductors, thus enabling reduction of the electromagnetic coupling between the first chip inductor and the second chip inductors. It is therefore possible to reduce the flow of a harmonic of a high-output transmission signal transferred via any of transmission paths AT to DT or the flow of spurious waves of intermodulation distortion between the transmission signal and another radio frequency signal into any of reception paths AR to DR due the electromagnetic coupling. As such, it is possible to reduce deterioration of the reception sensitivity of that reception path resulting from such flows. It is also possible to reduce the deterioration of the signal quality of a transmission signal output from radio frequency module 1A which occurs when a harmonic of a high-output transmission signal transferred via any of transmission paths AT to DT superposes on the high-output transmission signal.

For example, even when the frequency of a harmonic of communication band A amplified by transmission power amplifier 11 is included in the reception band of communication band C, module board 91 makes it possible to reduce the electromagnetic coupling between the second chip inductor of matching circuit 31 and the first chip inductor of diplexer 60. Accordingly, since it is possible to inhibit the harmonic from bypassing transmission filter 61T and flowing into the reception path of communication band C, deterioration of the reception sensitivity of radio frequency module 1A can be reduced. Furthermore, since it is possible to reduce the superposition of a harmonic on a transmission signal of communication band A output from transmission path AT, deterioration of the signal quality of a transmission signal output from radio frequency module 1A can be reduced.

With radio frequency module 1A according to this working example, it is desirable that the first chip inductor and the second chip inductors do not overlap in a plan view of module board 91.

According to this, a sufficient distance can be secured between the first chip inductor and the second chip inductors in the xy plane direction, and thus it is possible to further reduce interference of the electromagnetic field generated by the first chip inductor with the second chip inductors and interference of the electromagnetic fields generated by the second chip inductors with the first chip inductor. Accordingly, the electromagnetic coupling between the first chip inductor and the second chip inductors can be further reduced. As a result, it is possible to further reduce deterioration of the reception sensitivity of radio frequency module 1A, and further reduce deterioration of the signal quality of a transmission signal output from radio frequency module 1A.

Radio frequency module 1A according to this working example has been described as having a configuration in which module board 91 is disposed between: transmission power amplifiers 11 and 12, duplexers 61 to 64, matching circuits 31, 32, 41, and 42, and switch 55; and reception low noise amplifiers 21 and 22, switches 51, 52, 53, and 54, and diplexer 60. It is sufficient, however, if radio frequency module 1A has a configuration in which at least one of matching circuits 31, 32, 41, 42, 71, 72, 73, and 74 is disposed on principal surface 91a and diplexer 60 is disposed on principal surface 91b.

This makes it possible to reduce the flow of a harmonic of a high-output transmission signal transferred via any of transmission paths AT to DT or the flow of spurious waves of intermodulation distortion between the transmission signal and another radio frequency signal into any of reception paths AR to DR due the electromagnetic coupling, and reduce deterioration of the reception sensitivity of that reception path resulting from such flows, as compared to a radio frequency module having a configuration in which diplexer 60 and matching circuits 31, 32, 41, 42, 71, 72, 73, and 74 are disposed on the same principal surface. It is also possible to reduce the deterioration of the signal quality of a transmission signal output from radio frequency module 1A which occurs when a harmonic of a high-output transmission signal transferred via any of transmission paths AT to DT superposes on the high-output transmission signal.

For example, one of the second chip inductors disposed on principal surface 91a may be the chip inductor of matching circuit 31 or 32 connected to the output terminal of transmission power amplifier 11 or 12.

This makes it possible to inhibit the high-output transmission signals output from transmission power amplifiers 11 and 12 from flowing into the first chip inductor without passing through the transmission paths. As a result, it is possible to further reduce deterioration of the reception sensitivity of radio frequency module 1A, and further reduce deterioration of the signal quality of a transmission signal output from radio frequency module 1A.

Additionally, it is desirable that the first chip inductor and transmission power amplifiers 11 and 12 do not overlap in a plan view of module board 91.

According to this, a sufficient distance can be secured between the first chip inductor and transmission power amplifiers 11 and 12 in the xy plane direction, and thus it is possible to inhibit the high-output transmission signals output from transmission power amplifiers 11 and 12 from flowing into the first chip inductor without passing through the transmission paths. As a result, it is possible to further reduce deterioration of the reception sensitivity of radio frequency module 1A, and further reduce deterioration of the signal quality of a transmission signal output from radio frequency module 1A.

For example, one of the second chip inductors disposed on principal surface 91a may be the chip inductor of matching circuit 41 or 42 connected to the input terminal of reception low noise amplifier 21 or 22.

This makes it possible to inhibit a high-output transmission signal transferred via a transmission path from flowing into the second chip inductor without passing through a reception path. Accordingly, it is possible to further reduce deterioration of the reception sensitivity of radio frequency module 1A.

Additionally, it is desirable that the chip inductor of matching circuit 41 and reception low noise amplifier 21 overlap in a plan view of module board 91. Additionally, it is desirable that the chip inductor of matching circuit 42 and reception low noise amplifier 22 overlap in a plan view of module board 91.

According to this, since the chip inductor of matching circuit 41 and switch 53 are disposed in opposite positions on opposite sides of module board 91, it is possible to make short the length of a line connecting the chip inductor of matching circuit 41 and reception low noise amplifier 21. It is also possible to make short the length of a line connecting the chip inductor of matching circuit 42 and reception low noise amplifier 22. As a result, transfer loss in the reception paths can be reduced.

Note that module board 91 desirably has a multi-layer structure in which a plurality of dielectric layers are stacked, and at least one of the dielectric layers desirably has a ground electrode pattern formed therein. This enhances the electromagnetic-field shielding function of module board 91.

In radio frequency module 1A according to this working example, a plurality of external-connection terminals 150 are disposed on principal surface 91b of module board 91. Radio frequency module 1A transmits and receives electric signals to and from a motherboard that is disposed on the z-axis negative side of radio frequency module 1A, via the plurality of external-connection terminals 150. Some of external-connection terminals 150 are set to the ground potential of the motherboard. Of principal surfaces 91a and 91b, transmission power amplifiers 11 and 12 that cannot be readily reduced in profile are not disposed on principal surface 91b facing the motherboard, but reception low noise amplifiers 21 and 22 and switches 51, 52, 53, and 54 that can be readily reduced in profile are disposed on principal surface 91b, thus enabling profile reduction of radio frequency module 1A as a whole. Moreover, since a plurality of external-connection terminals 150 that are used as ground electrodes are disposed in the vicinity of reception low noise amplifiers 21 and 22 that have a significant impact on the reception sensitivity of the receiver circuits, it is possible to reduce deterioration of the reception sensitivity of the receiver circuits.

Note that, as illustrated in FIG. 2A and FIG. 2B, external-connection terminals 150 may be columnar electrodes penetrating through resin component 93 in the z-axis direction, or may be bump electrodes formed on principal surface 91b.

In this working example, transmission power amplifiers 11 and 12 are mounted on principal surface 91a, and reception low noise amplifiers 21 and 22 are mounted on principal surface 91b. According to this, since module board 91 is interposed between transmission power amplifiers 11 and 12 and reception low noise amplifiers 21 and 22, it is possible to reduce the direct flow of the transmission signals output from transmission power amplifiers 11 and 12 into reception low noise amplifiers 21 and 22. As a result, isolation between the transmitter circuits and the receiver circuits improves.

Furthermore, in radio frequency module 1A according to this working example, switch 55 is mounted on principal surface 91a, and switch 55 and the first chip inductor overlap in a plan view of module board 91. In this working example, switch 55 and the first chip inductor are connected via via conductor 91v that penetrates through module board 91 between principal surfaces 91a and 91b.

According to this, since switch 55 and the chip inductor of diplexer 60 are disposed in opposite positions on opposite sides of module board 91, it is possible to make short the length of a line connecting diplexer 60 and switch 55. As a result, transfer loss in both the transmission paths and the reception paths of radio frequency module 1A can be reduced.

Although not illustrated in FIG. 2A and FIG. 2B, it is desirable that the magnetic flux generated by the first chip inductor and the magnetic fluxes generated by the second chip inductors be orthogonal. Specifically, for example, it is sufficient if the winding axis of a coil included in the first chip inductor is orthogonal to the winding axes of coils included in the second chip inductors. This makes it possible to reduce interaction between the magnetic field defined by the first chip inductor and the magnetic fields defined by the second chip inductors. Accordingly, since the electromagnetic coupling between the first chip inductor and the second chip inductors can be reduced, the deterioration of the reception sensitivity of radio frequency module 1A can be further reduced.

Note that the magnetic flux generated by the first chip inductor and the magnetic fluxes generated by the second chip inductors need not be orthogonal, and it is sufficient if they at least intersect. Specifically, for example, it is sufficient if the winding axis of the coil included in the first chip inductor intersects with the winding axes of the coils included in the second chip inductors.

Note that reception low noise amplifiers 21 and 22 and switches 53 and 54 may be embedded in single semiconductor IC 10. Semiconductor IC 10 may include switches 51 and 52. This makes it possible to reduce the height on the principal surface 91b side in the z-axis direction, and reduce the component mounting area of principal surface 91b. Thus, radio frequency module 1A can be miniaturized.

[3. Arrangement of Circuit Elements of Radio Frequency Module 1B According to Working Example 2]

Figure 3A:
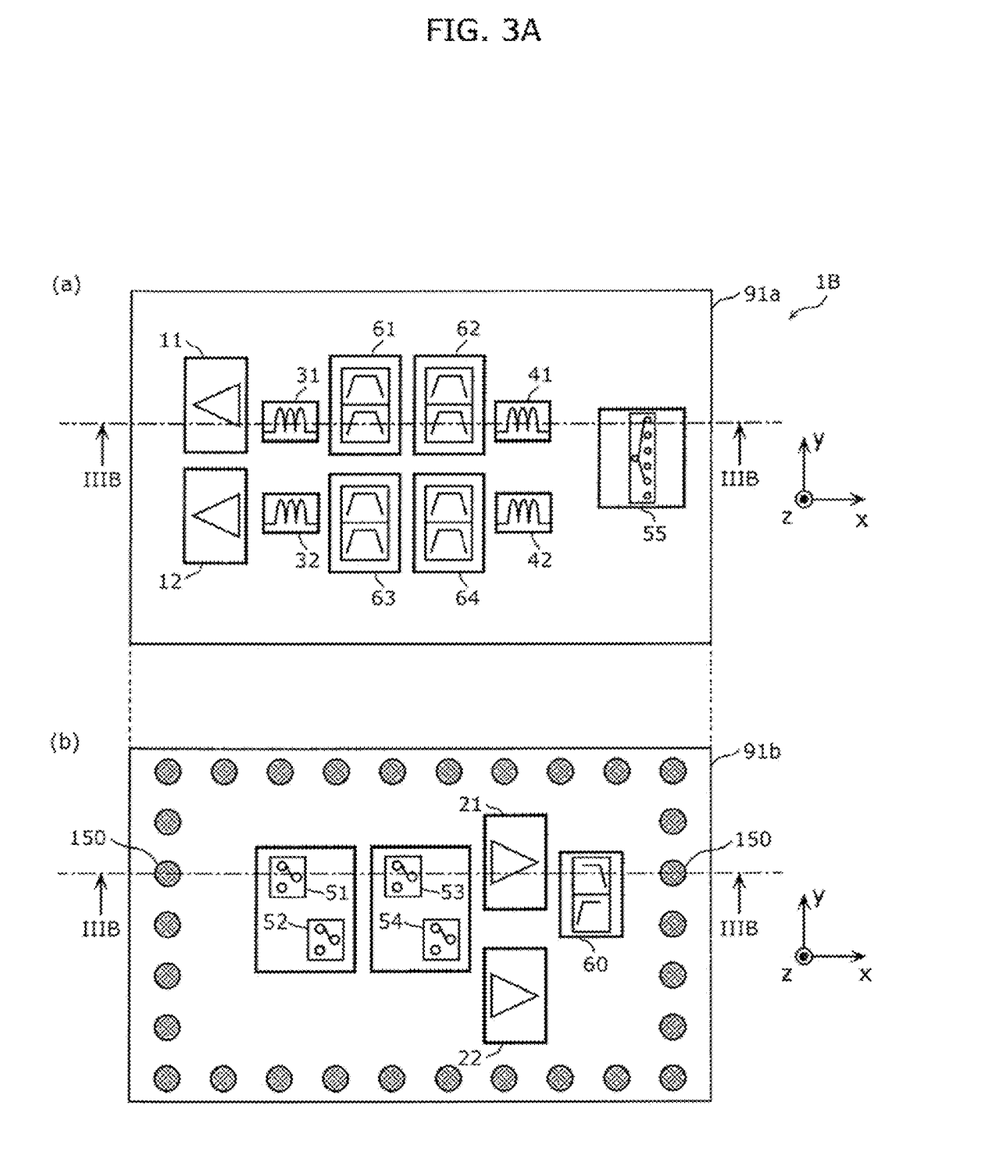
FIG. 3A is a schematic diagram illustrating a plan view configuration of a radio frequency module according to Working Example 2.
Figure 3B:
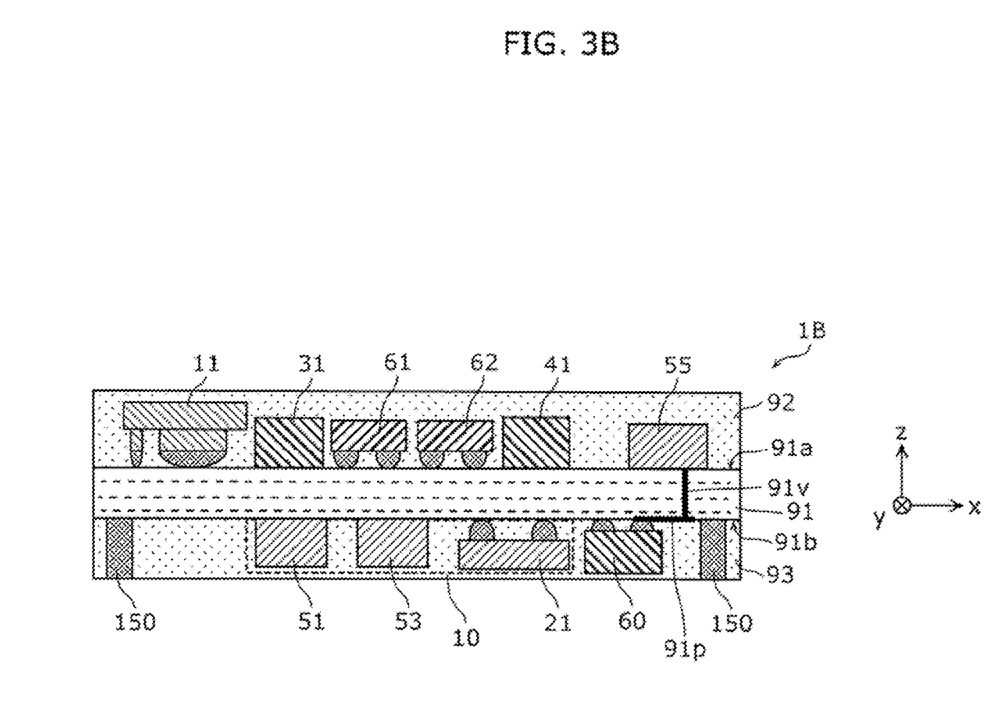
FIG. 3B is a schematic diagram illustrating a cross-sectional configuration of the radio frequency module according to Working Example 2.

FIG. 3A is a schematic diagram illustrating a plan view configuration of radio-frequency module 1B according to Working Example 2. FIG. 3B is a schematic diagram illustrating a cross-sectional configuration of radio frequency module 1B according to Working Example 2, and is specifically a cross-sectional view taken at line IIIB-IIIB in FIG. 3A. Note that part (a) of FIG. 3A illustrates how circuit elements are arranged when, of principal surfaces 91a and 91b located on opposite sides of module board 91, principal surface 91a is viewed from the z-axis positive side. Part (b) of FIG. 3A is a perspective view illustrating how circuit elements are arranged when principal surface 91b is viewed from the z-axis positive side.

Radio frequency module 1B according to Working Example 2 is to specifically show an arrangement of circuit elements included in radio frequency module 1 according to the embodiment.

Radio frequency module 1B according to this working example is different from radio frequency module 1A according to Working Example 1 only in the positions of diplexer 60 and switch 55 with respect to each other. Hereinafter, radio frequency module 1B according to this working example will be described, focusing on the aspects different from radio frequency module 1A according to Working Example 1 and omitting the description of the aspects that are the same as radio frequency module 1A.

As illustrated in FIG. 3A and FIG. 3B, in radio frequency module 1B according to this working example, transmission power amplifiers 11 and 12, duplexers 61 to 64, matching circuits 31, 32, 41, and 42, and switch 55 are surface-mounted on principal surface 91a of module board 91. Reception low noise amplifiers 21 and 22, switches 51, 52, 53, and 54, and diplexer 60 are surface-mounted on principal surface 91b of module board 91.

As illustrated in FIG. 3B, in radio frequency module 1B according to this working example, switch 55 and diplexer 60 are connected via via conductor 91v and planar line 91p. Via conductor 91v is a conductor that penetrates through module board 91 between principal surfaces 91a and 91b. Planar line 91p is a planar line pattern formed on principal surface 91b along principal surface 91a or 91b of module board 91 (i.e., in the xy plane direction).

A planar line pattern formed along principal surface 91a or 91b of module board 91 and having an inductance component is easily coupled electromagnetically with chip inductors mounted on module board 91. In view of this, with radio frequency module 1B according to this working example, planar line 91p is formed on principal surface 91b, and matching circuits 31, 32, 41, and 42 are mounted on principal surface 91a. In other words, planar line 91p and the chip inductors of matching circuits 31, 32, 41, and 42 are disposed with module board 91 interposed therebetween. According to this, module board 91 can shield the electromagnetic fields generated by planar line 91p and the chip inductors of matching circuits 31, 32, 41, and 42, thus enabling reduction of the electromagnetic coupling between planar line 91p and the chip inductors of matching circuits 31, 32, 41, and 42. Accordingly, it is possible to reduce deterioration of the reception sensitivity of the reception paths, and reduce deterioration of the signal quality of a transmission signal output from radio frequency module 1B.

[4. Advantageous Effects Etc.]

Radio frequency module 1 according to the present embodiment includes: module board 91 including principal surface 91a and principal surface 91b on opposite sides of module board 91; antenna connection terminal 100; diplexer 60 connected to antenna connection terminal 100 and including at least a first chip inductor; transmission power amplifier 11; reception low noise amplifier 21; and a second chip inductor disposed on one of a transmission path connecting diplexer 60 and transmission power amplifier 11 and a reception path connecting diplexer 60 and reception low noise amplifier 21, wherein the first chip inductor is mounted on principal surface 91b, and the second chip inductor is mounted on principal surface 91a.

Accordingly, since the first chip inductor and the second chip inductor are disposed with the module board interposed therebetween, module board 91 can shield the electromagnetic fields generated by the first chip inductor and the second chip inductor, thus enabling reduction of the electromagnetic coupling between the first chip inductor and the second chip inductor. Therefore, it is possible to reduce deterioration of the reception sensitivity of a reception path which occurs when a harmonic of a high-output transmission signal transferred via a transmission path flows or spurious waves of intermodulation distortion between the transmission signal and another radio frequency signal flow into the reception path due the electromagnetic coupling. It is also possible to reduce the deterioration of the signal quality of a transmission signal output from radio frequency module 1 which occurs when a harmonic of a high-output transmission signal transferred via a transmission path superposes on the high-output transmission signal.

Desirably, the first chip inductor and the second chip inductor do not overlap in a plan view of module board 91.

According to this, a sufficient distance can be secured between the first chip inductor and the second chip inductors in the xy plane direction, and thus it is possible to further reduce interference of the electromagnetic field generated by the first chip inductor with the second chip inductors and interference of the electromagnetic fields generated by the second chip inductors with the first chip inductor. Accordingly, the electromagnetic coupling between the first inductor and the second chip inductors can be further reduced. As a result, it is possible to further reduce deterioration of the reception sensitivity of radio frequency module 1, and further reduce deterioration of the signal quality of a transmission signal output from radio frequency module 1.

The second chip inductor may be a chip inductor of matching circuit 31 or 32 connected to an output terminal of transmission power amplifier 11 or 12.

This makes it possible to inhibit the high-output transmission signals output from transmission power amplifiers 11 and 12 from flowing into the first chip inductor without passing through the transmission paths. As a result, it is possible to further reduce deterioration of the reception sensitivity of radio frequency module 1, and further reduce deterioration of the signal quality of a transmission signal output from radio frequency module 1.

Desirably, transmission power amplifiers 11 and 12 are mounted on principal surface 91a, and the first chip inductor and transmission power amplifiers 11 and 12 do not overlap in a plan view of module board 91.

According to this, a sufficient distance can be secured between the first chip inductor and transmission power amplifiers 11 and 12 in the xy plane direction, and thus it is possible to inhibit the high-output transmission signals output from transmission power amplifiers 11 and 12 from flowing into the first chip inductor without passing through the transmission paths. As a result, it is possible to further reduce deterioration of the reception sensitivity of radio frequency module 1, and further reduce deterioration of the signal quality of a transmission signal output from radio frequency module 1.

The second chip inductor may be a chip inductor of matching circuit 41 or 42 connected to an input terminal of reception low noise amplifier 21 or 22.

This makes it possible to inhibit a high-output transmission signal transferred via a transmission path from flowing into the second chip inductor without passing through a reception path. Accordingly, it is possible to further reduce deterioration of the reception sensitivity of radio frequency module 1.

Desirably, reception low noise amplifiers 21 and 22 are mounted on principal surface 91b, and the chip inductor of matching circuit 41 and reception low noise amplifier 21 overlap, and the inductor of matching circuit 42 and reception low noise amplifier 22 overlap in a plan view of module board 91.

This makes it possible to make short the length of a line connecting the chip inductor of matching circuit 41 and reception low noise amplifier 21. It is also possible to make short the length of a line connecting the chip inductor of matching circuit 42 and reception low noise amplifier 22. As a result, transfer loss in the reception paths can be reduced.

External-connection terminal 150 connected to a motherboard may be disposed on principal surface 91b.

Radio frequency module 1 transmits and receives electric signals to and from a motherboard that is disposed on the z-axis negative side of radio frequency module 1, via the plurality of external-connection terminals 150. Some of external-connection terminals 150 are set to the ground potential of the motherboard. Transmission power amplifiers 11 and 12 that cannot be readily reduced in profile are not disposed on principal surface 91b disposed in a position opposite the motherboard, but reception low noise amplifiers 21 and 22 and switches 51, 52, 53, and 54 that can be readily reduced in profile are disposed on principal surface 91b, thus enabling profile reduction of radio frequency module 1 as a whole. Moreover, since a plurality of external-connection terminals 150 that are used as ground electrodes are disposed in the vicinity of reception low noise amplifiers 21 and 22 that have a significant impact on the reception sensitivity of the receiver circuits, it is possible to reduce deterioration of the reception sensitivity of the receiver circuits.

Radio frequency module 1 may further include: switch 55 connected to one of antenna connection terminal 100 and diplexer 60, and configured to switch connection and disconnection of antenna connection terminal 100 and the transmission path, and switch connection and disconnection of antenna connection terminal 100 and the reception path, wherein switch 55 may be mounted on principal surface 91a, and switch 55 and the first chip inductor may overlap in a plan view of module board 91.

According to this, since switch 55 and the chip inductor of diplexer 60 are disposed in opposite positions on opposite sides of module board 91, it is possible to make short the length of a line connecting diplexer 60 and switch 55. As a result, transfer loss in both the transmission paths and the reception paths of radio frequency module 1 can be reduced.

Radio frequency module 1 may further include: switch 55 connected to one of antenna connection terminal 100 and diplexer 60, and configured to switch connection and disconnection of antenna connection terminal 100 and the transmission path, and switch connection and disconnection of antenna connection terminal 100 and the reception path, wherein switch 55 may be mounted on principal surface 91a, switch 55 and the first chip inductor may be connected via (i) via conductor 91v configured to penetrate through module board 91 between principal surface 91a and principal surface 91b, and (ii) planar line 91p formed along one of principal surface 91a and principal surface 91b of module board 91, and planar line 91p may be formed on principal surface 91b.

According to this, the electromagnetic coupling between planar line 91p and the chip inductors of matching circuits 31, 32, 41, and 42 can be reduced. Accordingly, it is possible to reduce deterioration of the reception sensitivity of the reception paths, and reduce deterioration of the signal quality of a transmission signal output from radio frequency module 1.

Communication device 5 includes: RFIC 3 configured to process a radio frequency signal which is to be transmitted by antenna 2 and a radio frequency signal which has been received by antenna 2; and radio frequency module 1 configured to transfer the radio frequency signals between antenna 2 and RFIC 3.

According to this, it is possible to provide communication device 5 that reduces deterioration of the reception sensitivity or deterioration of the quality of a transmission signal.

Other Embodiments, etc

Although a radio frequency module and a communication device according to an embodiment of the present disclosure have been described based on the embodiment and working examples, the radio frequency module and the communication device according to the present disclosure are not limited to the above embodiment and working examples. The present disclosure also encompasses: other embodiments implemented by arbitrarily combining constituent elements in the above embodiment and working examples; variations obtained by making various modifications to the above embodiment and working examples that are conceivable to a person skilled in the art within the scope of the essence of the present disclosure; and various apparatuses that include the above radio frequency module and communication device.

For example, in the radio frequency module and the communication device according to the above embodiment and working examples thereof, circuit elements and lines, for instance, may be interposed between circuit elements and paths that connect signal paths illustrated in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to communication apparatuses such as mobile phones as a radio frequency module disposed in a multiband-compatible front-end unit.

The invention claimed is:

1. A radio frequency module, comprising:
a module board including a first principal surface and a second principal surface on opposite sides of the module board;
an antenna connection terminal;
an LC filter connected to the antenna connection terminal and including at least a first chip inductor;
a transmission power amplifier;
a reception low noise amplifier; and
a second chip inductor disposed on one of a transmission path connecting the LC filter and the transmission power amplifier and a reception path connecting the LC filter and the reception low noise amplifier, wherein
the first chip inductor is mounted on the first principal surface, and the chip second inductor is mounted on the second principal surface.

2. The radio frequency module of claim 1, wherein the first chip inductor does not overlap with the second chip inductor in a plan view of the module board.

3. The radio frequency module of claim 1, wherein the second chip inductor is an impedance matching inductor connected to an output terminal of the transmission power amplifier.

4. The radio frequency module of claim 3, wherein the transmission power amplifier is mounted on the second principal surface, and
the first chip inductor does not overlap with the transmission power amplifier in a plan view of the module board.

5. The radio frequency module of claim 1, wherein the second chip inductor is an impedance matching inductor connected to an input terminal of the reception low noise amplifier.

6. The radio frequency module of claim 5, wherein the reception low noise amplifier is mounted on the first principal surface, and
the second chip inductor and the reception low noise amplifier overlap in a plan view of the module board.

7. The radio frequency module of claim 1, wherein an external-connection terminal connected to a motherboard is disposed on the first principal surface.

8. The radio frequency module of claim 2, further comprising:
an antenna switch connected to one of the antenna connection terminal and the LC filter, and configured to switch connection and disconnection of the antenna connection terminal and the transmission path, and switch connection and disconnection of the antenna connection terminal and the reception path.

9. The radio frequency module of claim 8, wherein the antenna switch is mounted on the second principal surface.

10. The radio frequency module of claim 9, wherein the antenna switch and the first chip inductor overlap in a plan view of the module board.

11. The radio frequency module of claim 9, wherein
the antenna switch and the first chip inductor are connected via (i) a via conductor configured to penetrate through the module board between the first principal surface and the second principal surface, and (ii) a planar line formed along one of the first principal surface and the second principal surface of the module board.

12. The radio frequency module of claim 11, wherein
the planar line is formed on the first principal surface.

13. A communication device, comprising:
a radio frequency (RF) signal processing circuit configured to process a radio frequency signal which is to be transmitted by an antenna and a radio frequency signal which has been received by the antenna; and
a radio frequency module configured to transfer the radio frequency signals between the antenna and the RF signal processing circuit, the radio frequency module comprising
  a module board including a first principal surface and a second principal surface on opposite sides of the module board;
  an antenna connection terminal;
  an LC filter connected to the antenna connection terminal and including at least a first chip inductor;
  a transmission power amplifier;
  a reception low noise amplifier; and
  a second chip inductor disposed on one of a transmission path connecting the LC filter and the transmission power amplifier and a reception path connecting the LC filter and the reception low noise amplifier, wherein
  the first chip inductor is mounted on the first principal surface, and the second chip inductor is mounted on the second principal surface.

14. The communication device of claim 13, wherein
the first chip inductor does not overlap with the second chip inductor in a plan view of the module board.

15. The communication device of claim 13, wherein
the second chip inductor is an impedance matching inductor connected to an output terminal of the transmission power amplifier.

16. The communication device of claim 15, wherein
the transmission power amplifier is mounted on the second principal surface, and
the first chip inductor does not overlap with the transmission power amplifier in a plan view of the module board.

17. The communication device of claim 13, wherein
the second chip inductor is an impedance matching inductor connected to an input terminal of the reception low noise amplifier.

18. The communication device of claim 5, wherein
the reception low noise amplifier is mounted on the first principal surface, and
the second chip inductor and the reception low noise amplifier overlap in a plan view of the module board.

19. The radio frequency module of claim 13, wherein
an external-connection terminal connected to a motherboard is disposed on the first principal surface.

20. A radio frequency module, comprising:
a module board including a first principal surface and a second principal surface;
an antenna connection terminal;
an LC filter connected to the antenna connection terminal and including at least a first inductor;
a power amplifier;
a low noise amplifier; and
a second inductor disposed on one of a transmission path connecting the LC filter and the power amplifier and a reception path connecting the LC filter and the low noise amplifier, wherein
the first inductor is mounted on the first principal surface, and the second inductor is mounted on the second principal surface.

* * * * *